United States Patent [19]
Podlas

[11] 3,811,902
[45] May 21, 1974

[54] CONTROL OF POLYMER DEGRADATION RATE

[75] Inventor: Thomas J. Podlas, Newark, Del.

[73] Assignee: Hercules Incorporated, Wilmington, Del.

[22] Filed: Nov. 8, 1972

[21] Appl. No.: 304,701

[52] U.S. Cl...... 106/169, 260/231 CM, 260/29.6 M
[51] Int. Cl. ....................... C08f 45/24, C08b 21/26
[58] Field of Search ............... 260/29.6 M, 231 CM; 106/169

[56] References Cited
UNITED STATES PATENTS 3,240,736  3/1966  Mckennon ...................... 260/29.6
3,719,663  3/1973  Klug .................................. 260/231

Primary Examiner—William H. Short
Assistant Examiner—Peter F. Kulkosky
Attorney, Agent, or Firm—William S. Alexander

[57] ABSTRACT

The rate of degradation of anionic water-soluble polymers in the presence of persulfate ion is reduced and controlled by the presence of divalent manganese ion. The polymer can be either cross-linked or uncross-linked. Useful polymers to which the invention is applied are anionic acrylamidecopolymers and carboxymethyl cellulose.

4 Claims, No Drawings

CONTROL OF POLYMER DEGRADATION RATE

The use of thickened or viscous polymer solutions has become wide-spread in the oil industry for various secondary recovery and fracturing operations. Materials useful in such operations are copolymers based on acrylamide and an anionic copolymerizable comonomer. Such copolymers exhibit a good degree of water solubility and relatively small quantities thereof in solution lead to significant viscosity increases. The viscosity of such solutions per se is sufficient in many instances to accomplish the objective sought to be accomplished. In other cases, a greater viscosity or even a gel is required. In these situations a cross-linker can be added. Preferred materials for cross-linking are trivalent metal ions, in particular, chromium and aluminum. In either situation, it is also frequently desirable to be able, after a time, to decrease or destroy the viscosity of the solution, thus making it free flowing and easily removable from the formation.

In previous work it has been found that polymers of the type herein contemplated, either cross-linked or otherwise, can be degraded by means of a water-soluble persulfate. This method of breaking viscosity is extremely rapid, particularly at elevated temperatures such as might be found in an oil bearing formation and is thus frequently not totally satisfactory in situations where the high viscosity solution or the gel structure must be maintained for an extended period, say a day or more.

In accordance with this invention, it has been found that the degradation rate of the thickened solution under the influence of a persulfate oxidizer can be decreased and better controlled if there is included in the reactive mixture a small amount of water-soluble compound of divalent manganese. In brief, the invention comprises a method of controlling the rate of degradation under the influence of a water-soluble persulfate oxidizer of an anionic water-soluble polymer which method comprises including in an aqueous solution of said polymer and said persulfate a water-soluble ionizable compound of divalent manganese. The method of the invention is applicable to both cross-linked and un-cross-linked polymers.

The polymers to which the process is preferably applied are copolymers of acrylamide and an anionic, ethylenically unsaturated comonomer. The preferred comonomer is sodium acrylate or sodium methacrylate. The comonomer can constitute about 1 to 50 percent by weight of the total copolymer, preferably about 1 to 10 percent. Copolymers of this type are well known articles of commerce. The invention is also applicable to certain carboxyalkylated cellulose ethers such as, e.g., carboxymethyl cellulose.

The persulfate employed in the invention can be any water-soluble inorganic persulfate. Preferred are the alkali metal persulfates such as sodium persulfate, lithium persulfate, and particularly potassium persulfate. Other water-soluble persulfates, e.g., ammonium persulfate can also be employed. Generally the persulfate is present in concentration of about 0.1 to 15 percent by weight based on the amount of polymer present, although persulfate concentration, per se is not critical to this invention. What is important is the molar ratio of manganous ion to persulfate ion.

The mechanism by which the persulfate breaks the viscosity of the polymer solution is believed to involve breakdown of the polymer chain, undoubtedly via an oxidation reaction, although the point in the chain where the breakdown occurs is not known with certainty. Additionally, in the case of polymers which are cross-linked, e.g., with chromium ion, to form gels, the persulfate can oxidize the metallic cross-linking ion and thus destroy the cross-link and break the gel. The viscosity can be decreased by this technique virtually to that of water.

Any water-soluble, ionizable salt of divalent manganese can be employed in the process of this invention to control the rate of polymer degradation. Exemplary of such salts are manganous sulfate, manganous chloride, manganous nitrate, and manganous acetate.

The mechanism by which the manganous ion controls the degradation rate has not been definitely determined. However, it has been determined that divalent manganese ion can react with the ionic substituents of the copolymer to cause some viscosity build-up, which is indicative of some cross-linking and which can slow the rate of degradation. Further, the divalent manganese ion can be oxidized by the persulfate to manganic ion and the competition between the polymer and the manganese for the persulfate in effect reduces the persulfate concentration, resulting in slower degradation. In addition, the resulting manganic ion can cross-link the polymers which also slows the degradation rate. Cross-links resulting from the divalent manganese or manganic ion are then degraded by heat or other influences acting on the system.

In carrying out the process of this invention, it is preferred to prepare first a water solution of the copolymer and to add to this a solution containing a mixture of the manganous salt and the persulfate. Inasmuch as the persulfate can react with both of the other components in the system, it is desirable and even mandatory that all mixing of ingredients be effected immediately prior to utilization of the product, e.g., immediately prior to charging the viscous liquid to an oil-bearing formation. Alternatively, the manganous salt can be added to the polymer solution and, following dissolution thereof, a persulfate solution can be added to this mixture. In any event, there is sufficient reactivity between elements of the mixture that any mixing thereof should be done substantially immediately prior to use.

The invention is illustrated in the following examples, in which, unless otherwise specified, parts and percentages are by weight.

EXAMPLE 1

A copolymer consisting of about 90 percent by weight of acrylamide and 10 percent by weight sodium acrylate was dissolved in water to form a 0.5 percent solution. The viscosity of this solution was determined using a FANN VG viscometer. To each of three aliquots of this solution there was added 9 percent by weight, based on polymer, of potassium persulfate. One of the three was used as a control, without further modification, to one was added (based on polymer) 1.00 percent manganous sulfate and to the third there was added (based on polymer) 2.00 percent manganous sulfate. All three were then heat treated in an oven at 60°C. and their rates of degradation were followed via periodic viscosity readings on a FANN VG viscometer. Results are expressed as the percentage of the original viscosity which the solution retains after a given heat treatment time in the following table.

| Example No. | MnSO$_4$ Concentration | Mn$^{+2}$/S$_2$O$_8^{-2}$ | Time | % Viscosity Retention |
|---|---|---|---|---|
| 1-A | 0 | 0 | 1.5 hrs. | 58 |
| 1-B | 1.00 | 0.20 | do. | 81 |
| 1-C | 2.00 | 0.40 | do. | 82 |
| 1-D | 0 | 0 | 3 hrs. | 15 |
| 1-E | 1.00 | 0.20 | do. | 76 |
| 1-F | 2.00 | 0.40 | do. | 78 |
| 1-G | 0 | 0 | 6 hrs. | 8 |
| 1-H | 1.00 | 0.20 | do. | 67 |
| 1-I | 2.00 | 0.40 | do. | 72 |
| 1-J | 0 | 0 | 24 hrs. | 0 |
| 1-K | 1.00 | 0.20 | do. | 28 |
| 1-L | 2.00 | 0.40 | do. | 37 |
| 1-M | 0 | 0 | 48 hrs. | — |
| 1-N | 1.00 | 0.20 | do. | 2 |
| 1-O | 2.00 | 0.40 | do. | 3 |

EXAMPLE 2

A one percent (1 percent) aqueous solution of the polymer employed in Example 1 was prepared and divided into four aliquots. These were treated with manganous sulfate and/or potassium persulfate at the concentration levels shown in the chart below. When reagents were added, they were initially mixed in appropriate portions in dilute aqueous solution and this solution was added to the polymer solution immediately.

| Example No. | MnSO$_4$ Conc. | K$_2$S$_2$O$_8$ Conc. | Mn$^{+2}$/S$_2$O$_8^{-2}$ |
|---|---|---|---|
| 2-A | 0 | 0.375% | 0 |
| 2-B | 0.26% | 0.375% | 1.04 |
| 2-C | 0 | 0.625% | 0 |
| 2-D | 0.26% | 0.625% | 0.63 |

The four specimens thus prepared were heated in an oven at 90°C. and their viscosities were measured periodically until they had deteriorated to substantially that of water. The rate of degradation is indicated in the following table as the percentage of its initial viscosity which is retained at various times.

| Example No. | 1 hr. | 2 hr. | 3 hr. | 4 hr. | 6 hr. | 24 hrs. |
|---|---|---|---|---|---|---|
| 2-A | 82 | 22 | 5 | 0 | — | — |
| 2-B | 84 | 77 | 71 | 65 | 54 | 0 |
| 2-C | 73 | 2 | 0 | — | — | — |
| 2-D | 81 | 73 | 67 | 59 | 45 | 0 |

EXAMPLE 3

In this example, the copolymer composition was about 98.5 percent acrylamide and 1.5 percent sodium acrylate and its concentration was 1 percent. The oven temperature was 80°C.

| Example No. | %K$_2$S$_2$O$_8$ | %MnSO$_4$ | Mn$^{+2}$/S$_2$O$_8^{-2}$ | Viscosity Retention | | | | | | | | |
|---|---|---|---|---|---|---|---|---|---|---|---|---|
| | | | | ½ hr. | 1 hr. | 2 hr. | 3 hr. | 4 hr. | 5 hr. | 20 hr. | 24 hr. | 48 hr. |
| 3-A | 0.375 | 0 | 0 | 88 | 79 | 59 | 36 | — | — | 2.4 | — | 0 |
| 3-B | 0.375 | 0.225 | 1.08 | 88 | 82 | 71 | 66 | 63 | 63 | — | 27 | 32 |
| 3-C | 0.625 | 0 | 0 | 84 | 78 | 51 | 21 | — | — | 1.2 | — | 0 |
| 3-D | 0.625 | 0.225 | 0.65 | 88 | 80 | 71 | 68 | 63 | 63 | — | 14.6 | 17.1 |
| 3-E | 1.25 | 0 | 0 | 88 | 72 | 36 | 11 | — | — | 1.2 | — | 0 |
| 3-F | 1.25 | 0.75 | 1.08 | 83 | 77 | 71 | 61 | 52 | 38 | — | 6.1 | — |

EXAMPLE 4

In this example a 1 percent solution of the 90/10 copolymer used in Example 1 was treated at 80°C. with 0.625 percent potassium persulfate and varying amounts of manganous sulfate. The results, recorded in the following table, indicate that the rate of viscosity loss can be controlled by varying the amount of manganous sulfate relative to the amount of persulfate.

| Example No. | %MnSO$_4$ | Mn$^{+2}$/S$_2$O$_8^{-2}$ | % Viscosity Retention | | | | |
|---|---|---|---|---|---|---|---|
| | | | 1 hr. | 2 hr. | 3 hr. | 4 hr. | 5 hr. |
| 4-A | 0 | 0 | 81 | 38 | 16 | — | — |
| 4-B | 0.15 | 0.43 | 84 | 77 | 73 | 4 | 2.8 |
| 4-C | 0.225 | 0.65 | 87 | 79 | 73 | 60 | 54 |

EXAMPLE 5

A 1 percent aqueous solution of a copolymer of about 98.5 percent by weight acrylamide and 1.5 percent sodium acrylate was prepared and divided into several aliquots. To these was added 1.9 percent chrome alum to effect gelling and potassium persulfate and manganous sulfate in the amounts shown in the following table. Gelling occurred within about 20 minutes. The gel were immediately placed in an 80°C. oven and the time for gel breaking to occur was noted. The gel is considered to be broken when it becomes readily pourable without lumps.

| Example No. | %$K_2S_2O_8$ | %$MnSO_4$ | $Mn^{+2}/S_2O_8^{-2}$ | Time for Gel Breaking |
|---|---|---|---|---|
| 5-A | 0.167 | — | 0 | overnight* |
| 5-B | do. | 0.5 | 5.4 | Intact after 2 days |
| 5-C | do. | 1.51 | 16.20 | Intact after 2 days |
| 5-D | 0.33 | — | 0 | 3–4 hours |
| 5-E | do. | 0.05 | 0.27 | 4–6 hours |
| 5-F | do. | 0.1 | 0.54 | 4–5 hours |
| 5-G | do. | 0.2 | 1.08 | Intact after 2 days |
| 5-H | do. | 0.4 | 2.16 | Intact after 2 days |

* between 3 and 19 hours

EXAMPLE 6

Example 5 was repeated except that the copolymer employed was the 90/10 copolymer used in Example 1.

| Example No. | %$K_2S_2O_8$ | %$MnSO_4$ | $Mn^{+2}/S_2O_8^{-2}$ | Time For Gel Breaking |
|---|---|---|---|---|
| 6-A | 0.167 | — | 0 | 2–3 hours |
| 6-B | do. | 0.5 | 5.40 | overnight* |
| 6-C | do. | 1.51 | 16.2 | do. |

* between 7 and 24 hours.

EXAMPLE 7

A 1 percent solution of a high viscosity carboxymethyl cellulose having a D.S. of 0.7 was prepared and divided into three portions. To these were added 2.8 percent chrom alum, 9.0 percent potassium persulfate, and 0, 0.1 percent and 0.2 percent respectively of manganous sulfate. The solutions gelled almost instantaneously and were placed in an oven at 80°C. until the gels broke as evidenced by their degradation to a free-flowing pourable liquid. Pertinent data are recorded in the following table.

| Example No. | %$MnSO_4$ | $Mn^{+2}/S_2O_8^{-2}$ | Time For Gel Breaking |
|---|---|---|---|
| 7-A | 0 | 0 | 7–10 hrs. |
| 7-B | 0.1 | 0.02 | overnight* |
| 7-C | 0.2 | 0.04 | do. |

* between 13 and 22 hours.

EXAMPLE 8

A 1.0 percent in water was prepared with a 90/10 acrylamide sodium acrylate copolymer. To each of three aliquots of this solution was added 0.625 percent potassium persulfate and varying amounts of manganous chloride. These were heated at 80°C. in an oven. Viscosity retention data are recorded in the following table.

It is clear from the data in the preceding examples that the presence of the manganese ion in the system significantly delays the degradation of the polymer, whether the polymer is cross-linked to form a gel or simply dissolved to form a viscous liquid. The degree of control over degradation is regulated by the molar ratio of divalent manganese ion to persulfate ion present in the system. That is to say, the time required to reach a preselected viscosity condition varies inversely with the ratio of mangenese ion to persulfate ion in the system. In most cases, a molar ratio of manganese ion to persulfate between about 0.02 and 20 will provide adequate control over the degradation. Higher ratios do not afford any better control.

What I claim and desire to protect by Letters Patent is:

1. A method for controlling the rate of degradation under the influence of a persulfate oxidizer of a water-soluble polymer selected from the class consisting of 1) copolymers of acrylamide and an anionic copolymerizable comonomer and 2) carboxymethylcellulose which method comprises incorporating, into an aqueous solution of said polymer and said persulfate, a water-soluble salt of divalent manganese in such quantity that the molar ratio of manganese ion to persulfate ion is between about 0.02 and 20.

2. The method of claim 1 where the anionic water-soluble polymer is a copolymer of about 90 to 99 percent by weight acrylamide and 10 to 1 percent by weight sodium acrylate.

3. The method of claim 1 where the anionic water-soluble polymer is carboxymethyl cellulose.

4. The method of claim 2 where the salt of divalent manganese is manganous sulfate and the persulfate is potassium persulfate.

| Example No. | %$MnCl_2$ | $Mn^{+2}/S_2O_8^{-2}$ | % Viscosity Retention | | | | |
|---|---|---|---|---|---|---|---|
| | | | 1 hr. | 2 hr. | 3 hr. | 4 hr. | 5 hr. |
| 8-A | 0 | 0 | 81 | 38 | 16 | — | — |
| 8-B | 0.15 | 0.45 | 85 | 74 | 71 | 55 | 42 |
| 8-C | 0.225 | 0.67 | 87 | 78 | 70 | 61 | 56 |

* * * * *